US012034320B2

United States Patent
Kim et al.

(10) Patent No.: US 12,034,320 B2
(45) Date of Patent: Jul. 9, 2024

(54) WIRELESS POWER CHARGING WITH AUTHENTICATION

(71) Applicant: Renesas Electronics America Inc., Milpitas, CA (US)

(72) Inventors: Changjae Kim, San Jose, CA (US); Damla Acar, La Mesa, CA (US); Adnan Dzebic, San Jose, CA (US); Pooja Agrawal, Milpitas, CA (US); Sophia Yi, Milpitas, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 413 days.

(21) Appl. No.: 17/321,312

(22) Filed: May 14, 2021

(65) Prior Publication Data

US 2021/0384747 A1    Dec. 9, 2021

Related U.S. Application Data

(60) Provisional application No. 63/036,395, filed on Jun. 8, 2020.

(51) Int. Cl.
| | |
|---|---|
| *H04L 29/06* | (2006.01) |
| *G06F 21/30* | (2013.01) |
| *H02J 7/00* | (2006.01) |
| *H02J 50/10* | (2016.01) |
| *H02J 50/80* | (2016.01) |
| *H04L 9/08* | (2006.01) |
| *H04L 9/32* | (2006.01) |

(52) U.S. Cl.
CPC .......... *H02J 7/00045* (2020.01); *G06F 21/30* (2013.01); *H02J 50/10* (2016.02); *H02J 50/80* (2016.02); *H04L 9/0869* (2013.01); *H04L 9/3236* (2013.01); *H04L 9/3239* (2013.01)

(58) Field of Classification Search
CPC ........ H02J 7/00045; H02J 50/10; H02J 50/80; H02J 50/12; H02J 7/00032; H02J 7/02; H02J 50/005; G06F 21/30; G06F 21/44; H04L 9/0869; H04L 9/3236; H04L 9/3239; H04L 9/3226; H04L 63/083; H04L 2209/80
See application file for complete search history.

(56) References Cited

U.S. PATENT DOCUMENTS

| | | | | |
|---|---|---|---|---|
| 10,169,587 B1 * | 1/2019 | Nix | ..................... | H04W 12/041 |
| 11,102,653 B2 * | 8/2021 | Li | ........................ | H04W 12/041 |

(Continued)

*Primary Examiner* — Mahfuzur Rahman

(74) *Attorney, Agent, or Firm* — Haynes and Boone, LLP

(57) ABSTRACT

An authentication method for authenticating a wireless power transmitter to a wireless power receiver includes receiving a SSP value, an ID, and a random number RND from a wireless power receiver; determining an index based on the RND; choosing a base code from a set of base codes according to the index; determining a secure code from the base code, the index, the RND, the SSP value, and the ID; and transmitting the secure code to the wireless power receiver. A further method includes receiving a secure code from the wireless power transmitter; retrieving an index from the secure code; determining a base code from a set of base codes according to the index; calculating a second secure code; and authenticating the wireless power transmitter by comparing the secure code and the second secure code.

19 Claims, 4 Drawing Sheets

(56) References Cited

U.S. PATENT DOCUMENTS

| | | | |
|---|---|---|---|
| 2007/0101122 A1* | 5/2007 | Guo | H04L 9/0844 |
| | | | 713/153 |
| 2007/0186105 A1* | 8/2007 | Bailey | H04L 9/3234 |
| | | | 713/168 |
| 2016/0197488 A1* | 7/2016 | Hada | H02J 50/90 |
| | | | 307/104 |
| 2020/0103894 A1* | 4/2020 | Cella | G05B 23/0264 |
| 2022/0286846 A1* | 9/2022 | Arkko | H04L 9/3271 |

* cited by examiner

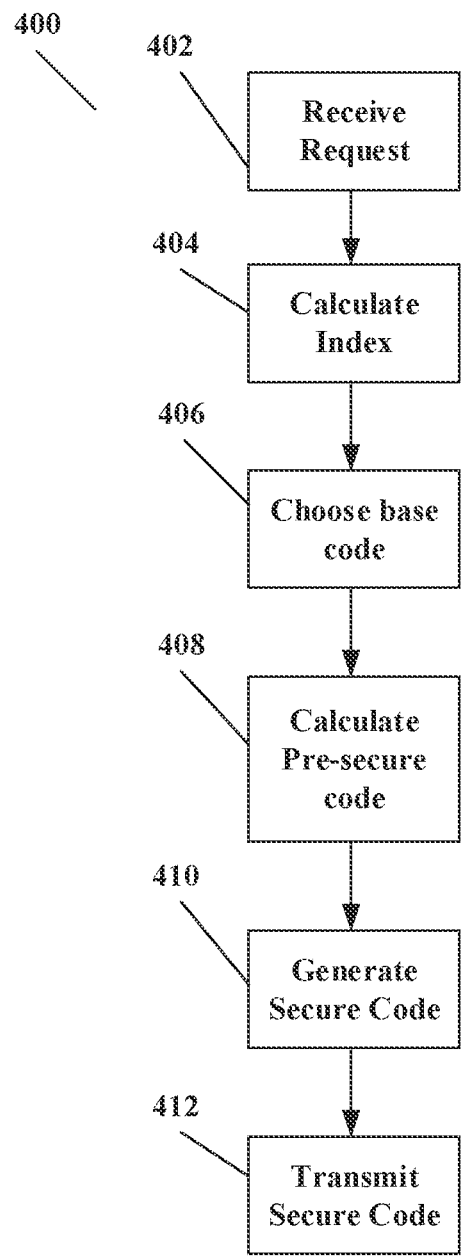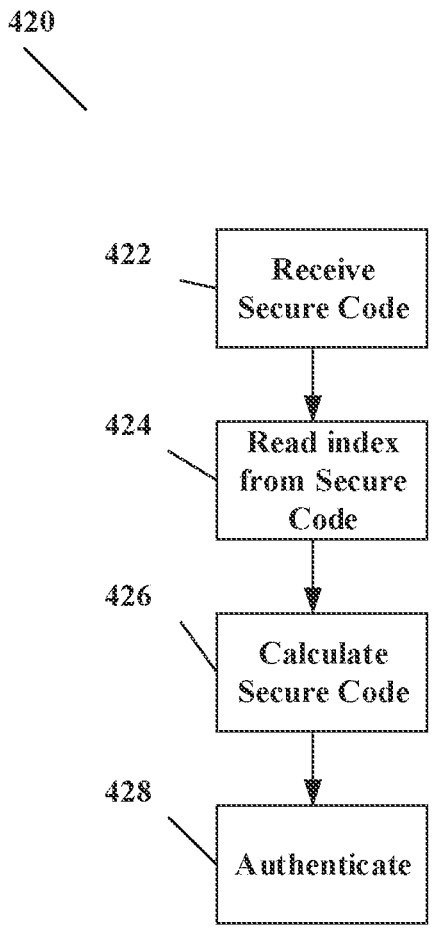
Figure 4A
Figure 4B

WIRELESS POWER CHARGING WITH AUTHENTICATION

RELATED APPLICATION

The present disclosure claims priority to U.S. Provisional Application Ser. No. 63/036,395, entitled "Wireless Power Charging with Authentication," filed by the same inventors on Jun. 8, 2020, which is herein incorporated by reference in its entirety.

TECHNICAL FIELD

Embodiments of the present invention are related to wireless transmission of power and, in particular, to wireless power charging with authentication.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

Typically, a wireless power system includes a transmitter coil that is driven to produce a time-varying magnetic field and a receiver coil, which can be part of a receiving device such as a cell phone, personal data assistant (PDA), tablet, laptop computer, or other device, that is positioned relative to the transmitter coil to receive the power transmitted in the time-varying magnetic field. In some embodiments, the receiving device can be a high-power device such as an electric vehicle, energy storage device, or other large energy storage device.

Therefore, there is a need to develop improved ways to arrange for wireless power transfer, especially in high power situation.

SUMMARY

An authentication method for authenticating a wireless power transmitter to a wireless power receiver is presented. A method of authentication includes receiving a SSP value, an ID, and a random number RND from a wireless power receiver; determining an index based on the RND; choosing a base code from a set of base codes according to the index; determining a secure code from the base code, the index, the RND, the SSP value, and the ID; and transmitting the secure code to the wireless power receiver. A further method of authentication includes transmitting a SSP value, an ID, and a random number to a wireless power transmitter; receiving a secure code from the wireless power transmitter; retrieving an index from the secure code; determining a base code from a set of base codes according to the index; calculating a second secure code from the SSP, the ID, the random number, and the base code; and authenticating the wireless power transmitter by comparing the secure code and the second secure code.

A wireless power transmitter according to some embodiments includes an inverter coupled to drive a transmission coil; a FSK modulator coupled to the inverter to transmit data to a wireless power receiver; an ASK demodulator coupled to the inverter to receive data from the wireless power receiver; and a processor coupled to the inverter, the FSK modulator, and the ASK demodulator. The processor executes instructions to receive a SSP value, an ID, and a random number RND from a wireless power receiver; determine an index based on the RND; choose a base code from a set of base codes according to the index; determine a secure code from the base code, the index, the RND, the SSP value, and the ID; and transmit the secure code to the wireless power receiver.

A wireless power receiver according to some embodiments includes a rectifier coupled to a receiver coil; a FSK demodulator coupled to the rectifier to receive data from a wireless transmitter; an ASK modulator coupled to the rectifier to transmit data to the wireless transmitter; and a processor coupled to the rectifier, the FSK demodulator, and the ASK modulator. The processor executes instructions to transmit a SSP value, an ID, and a random number to a wireless power transmitter; receive a secure code from the wireless power transmitter; retrieve an index from the secure code; determine a base code from a set of base codes according to the index; calculate a second secure code from the SSP, the ID, the random number, and the base code; and authenticate the wireless power transmitter by comparing the secure code and the second secure code.

These and other embodiments are discussed below with respect to the following figures.

BRIEF DESCRIPTION OF THE FIGURES

FIGS. 4A and 4B illustrate processes executed on the wireless power transmitter and the wireless power receiver, respectively, according to some embodiments.

These figures are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
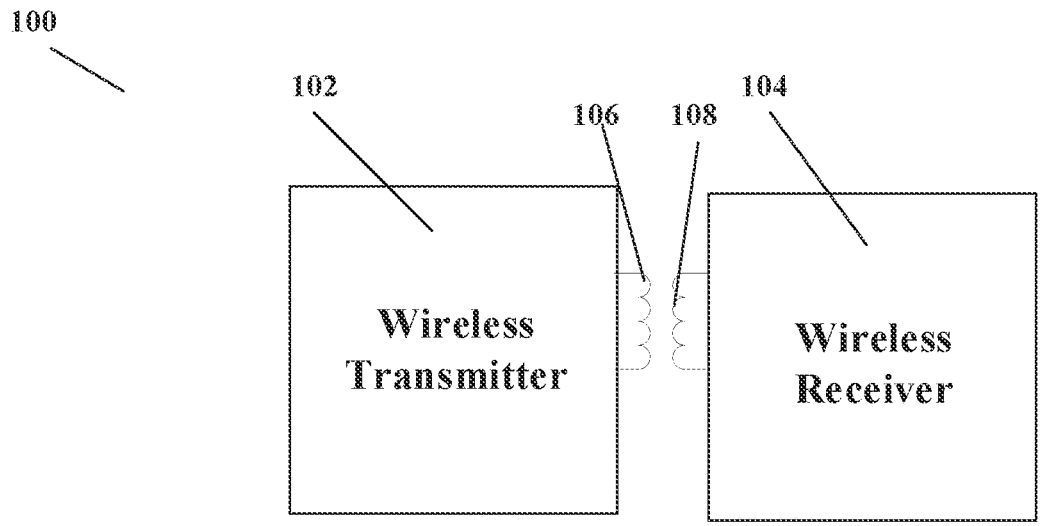
FIG. 1 illustrates a wireless power transmission system.

FIG. 1 illustrates an example wireless power transmission system 100. As illustrated in FIG. 1, a wireless transmitter 102 is coupled to a coil 106 and a wireless receiver 104 is coupled to a coil 108. Coil 106 is driven by wireless transmitter 102 to produce a time varying magnetic field that in turn induces a current in coil 108. Coil 108 is coupled to wireless receiver 104, which can receive the power transmitted through the time varying magnetic field from wireless device 102.

Wireless receiver 104 can be any device with wireless power functions. Many phones, laptops, tablets, and other devices include a wireless power function. In many cases, these devices can both receive and transmit wireless power. In some examples, wireless transmitter 102 may be a stationary wireless power charger (e.g., built into a table, floor, or other structure).

Embodiments of the present disclosure provide for authentication of the wireless power transmitter to the wireless power receiver. Authentication according to embodiments of the present disclosure can be implemented in any wireless power transmission system and may be particularly applicable to high-power wireless power transmission systems. A method of authentication executed in a wireless power transmitter according to some embodiments of the present disclosure includes receiving a signal strength value (the SSP value) from a signal strength packet (SSP), an ID, and a random number received from a wireless power receiver. An index can be determined based on the random number, from which a base code can be determined. A secure code can then be determined from the base code, the index, the random number, the SSP value, and the ID. The secure code can then be transmitted to the wireless power receiver. The method executed in the wireless power receiver includes transmitting a SSP value, an ID, and a random number to a wireless power transmitter. The receiver can then receive a secure code from the wireless power transmitter, the secure code including the index. The receiver can then calculate a second secure code. Consequently, the wireless power receiver can authenticate the wireless power transmitter from a comparison of the secure code with the second secure code.

Figure 2A:
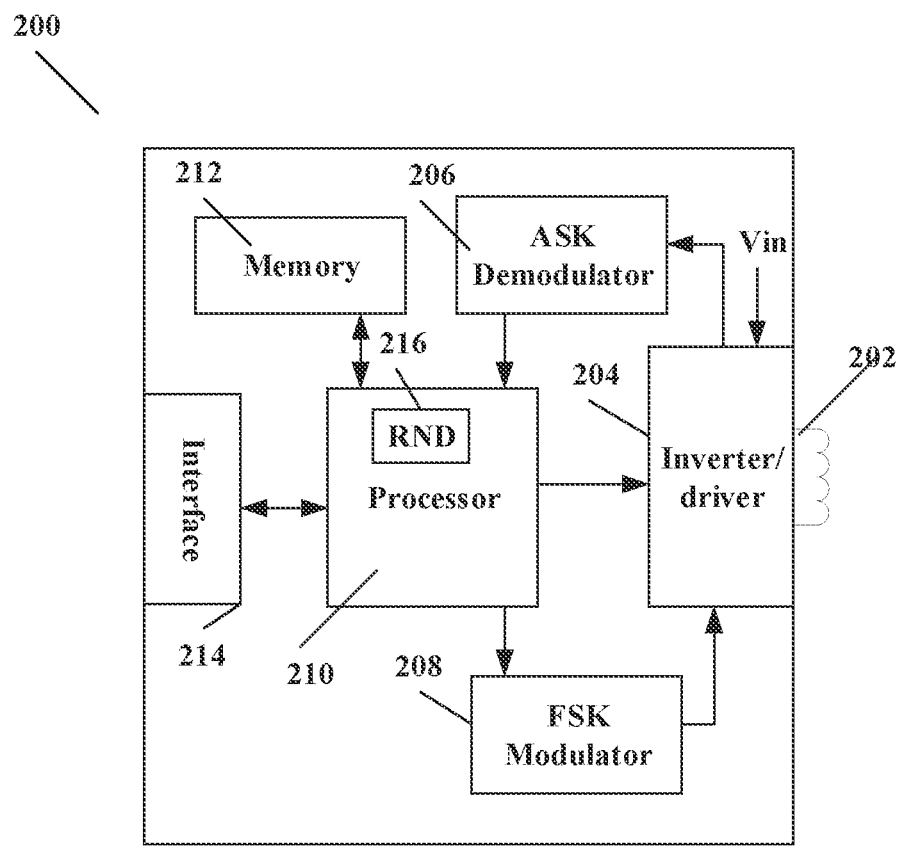
FIGS. 2A and 2B illustrates a wireless power transmitter and a wireless power receiver, respectively.

FIG. 2A illustrates an example of a wireless power transmitter (PTx) 200 on which embodiments of the present invention may be executed. PTx 200 may be formed on a single IC that is coupled to a transmit coil 202. PTx 200 receives power from an outside source, Vin, and drives transmit coil 202 to transmit power to a receiving device. As is illustrated in FIG. 2A, PTx 200 includes an inverter/driver 204 coupled to drive transmit coil 202 according to instructions from a processor 210.

Processor 210 is also coupled to a frequency shift key (FSK) modulator 208 for transmission of in-band data through the time-varying magnetic field generated by transmission coil 202 to a receiver device. Further, processor 210 is coupled to an amplitude shift key (ASK) modulator 206 to receive in-band data that is transmitted by the receiver device. FSK modulator 208 is coupled to inverter driver 204 to modulate transmission data received from processor 210 by frequency shifting the output frequency of the time-varying magnetic field generated at transmission coil 202 to represent a digital data stream corresponding to the transmission data. Additionally, ASK demodulator 206 monitors the amplitude of the time-varying magnetic field generated at transmission coil 202 to detect and decode digital data encoded by modulating the load on a receive coil of the receiver device.

Processor 210 can be any processing device that is capable of executing instructions to perform the functions described in this disclosure. In some embodiments, processor 210 is coupled through interface 214 to another device that provides instructions, in which case the functions described in this disclosure are performed by a combination of processor 210 and a device coupled through interface 214 with processor 210. Processor 210 can include any combination of microcomputers, microprocessors, state machines, or other circuitry that perform a part or all of the functions described in this disclosure.

Processor 210 can be coupled to a memory 212. Memory 212 can be any combination of volatile and non-volatile memory that stores data and instructions executed in processor 210. Memory 212 also includes any registers that are used in operation of processor 210.

As is further illustrated in FIG. 2A, processor 210 includes a random number generator 216 for generation of a random number. In some embodiments, random number generator 216 may be instructions executing in a computation device of processor 210. In some embodiments, random number generator 216 may be a stand-along random number generator circuit that provides a random number to processor 210.

Figure 2B:
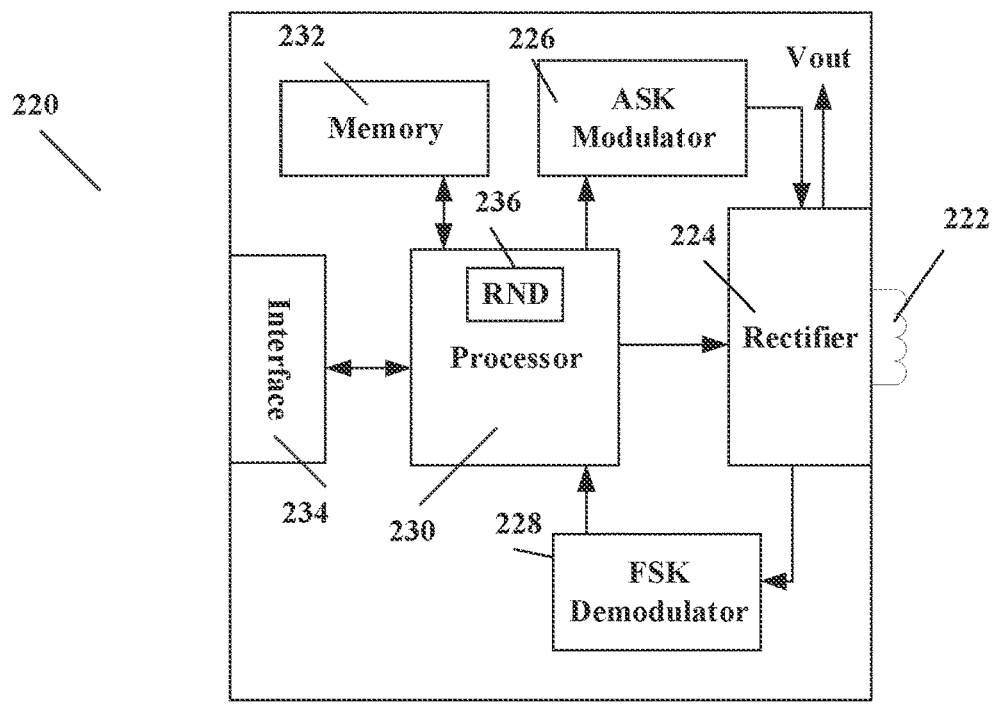

FIG. 2B illustrates a wireless power receiver (PRx) 220 that can be brought proximate to PTx 200 to receive the wireless power transmitted by PTx 200. As is illustrated in FIG. 2B, a receive coil 222 receives power from a time-varying magnetic field generated by PTx 200 and rectifies the received power to generate an output voltage Vout in rectifier 224. Rectifier 224 can be controlled by a processor 230 to efficiently receive the power transmitted by PTx 200.

As is further illustrated in FIG. 2B, an ASK modulator 226 modulates the load on receive coil 222 to transmit digital data received from processor 230. An FSK demodulator 228 monitors the frequency of the received time-varying magnetic field and receives digital data that has been modulated into the frequency shifts. ASK modulator 226 and FSK demodulator 228 are coupled to processor 230, which receives digital data transmitted by PTx 200 from FSK demodulator 228 and sends digital data to ASK modulator 226 for transmission to PTx 200.

Processor 230 can be any processing device that is capable of executing instructions to perform the functions described in this disclosure. In some embodiments, processor 230 is coupled through interface 234 to another device that provides instructions, in which case the functions described in this disclosure are performed by a combination of processor 230 and a device coupled through interface 234 with processor 230. Processor 230 can include any combination of microcomputers, microprocessors, state machines, or other circuitry that perform a part or all of the functions described in this disclosure.

Processor 230 can be coupled to a memory 232. Memory 232 can be any combination of volatile and non-volatile memory that stores data and instructions executed in processor 230. Memory 232 also includes any registers that are used in operation of processor 230.

As is further illustrated in FIG. 2B, processor 230 includes a random number generator 236 for generation of a random number. In some embodiments, random number generator 236 may be instructions executing in a computation device of processor 230. In some embodiments, random number generator 236 may be a stand-along random number generator circuit that provides a random number to processor 230.

Figure 3:
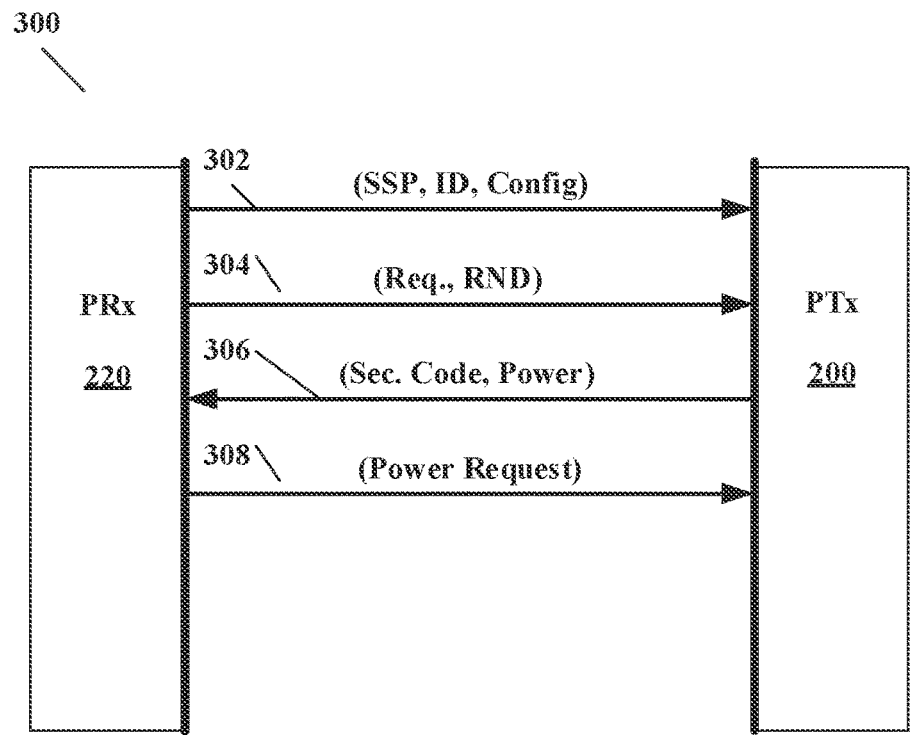
FIG. 3 illustrates a communications scheme arranging authenticated wireless power transmission according to some embodiments.

FIG. 3 illustrates a communications procedure 300 to authenticate PTx 200 by PRx 220 according to embodiments as disclosed here. Once authentication has been complete, receipt of power in PRx 220 from PTx 200 can be initiated. Communication 302 represents transmission from PRx 220 to PTx 200 and includes an SSP value, the receiver ID, and often configuration parameters. In some embodiments, communication 302 can include multiple packets, including SSPs, ID packets, configuration packets, control error packet (CEP) or other communications.

Communications 304 represents a transmission from PRx 220 to PTx 200 that starts a request for authentication and transmission of power. Communications 304 includes the request for power and a random number RND generated by PRx 220. Communications 306 represents a transmission from PTx 200 to PRx 220 that includes a security code generated by PTx 200 along with a potential power level. The security code is calculated in PTx 200 as discussed further below. Communications 308 is a transmission from PRx 220 to PTx 200 a request for transmission of power. As discussed further below, communications 308 is only transmitted after PRx 220 has authenticated PTx 200. In some embodiments, communications may cease if PRx 220 does not authenticate PTx 200, although in some embodiments more than one attempt at authentication may be performed before communications is halted.

Communications 308 can further represent a series of communications between PRx 220 and PTx 200 to negotiate or renegotiate power levels for wireless power transmission after PRx 220 has authenticated PTx 200. In some embodiments, PRx 220 and PTx 200 can operate in multiple modes, including no power transfer to a high-power transfer. In some embodiments, PRx 220 and PTx 200 can operate in a no or low mode of power transfer without authentication and can operate in a high-power mode only with authentication. In some embodiments, the high-power mode can include power levels over 10 W of wireless power transfer, for example between 15 W and 40 W of power transfer. In some embodiments, high powers may be possible.

In some embodiments, each of communications is transmitted in packet format. As an example, the packet can include an 8-bit (1 byte) header and a number of bytes, labeled B0 ... BN, of data. In some embodiments, N is 4 so that a packet includes 6 bytes of data (the header and bytes B0-B4). Communications 302, for example, may be transmitted using multiple packets.

In accordance with some embodiments, PTx 200, after receiving the SSP packet and the ID packet, can combine the SSP packet value, the serial number ID of PRx 220, the random number RND transmitted by PRx 220, and random numbers generated by PTx 200 to generate the security code.

FIGS. 4A and 4B illustrate some embodiments of authentication according to this disclosure. FIG. 4A illustrates a process 400 that is executed on PTx 200 and FIG. 4B illustrates a process 420 that can be executed on PRx 220. As illustrated in FIG. 4A, process 400 begins in step 402 with receipt of communications 304 that includes an authentication request and a random number from PRx 220. Prior to step 402, PTx 200 has already received communication 302 from PRx 220 with the SSP value, ID, and other data.

In step 404 an index is calculated in PTx 200. The index can be calculated from the random number RND received from PRx 220 and further random numbers derived in PTx 200. Consequently, the index can be calculated as follows:

$$\text{Index} = F(\text{RND}, TX \text{ RND } 1, \ldots, TX \text{ RND } N)$$

In some embodiments, the calculation of the Index can include further parameters, for example the SSP value, ID, or other data that is accessible to both PRx 220 and PTx 200. The function F can be any function that is shared by both PRx 220 and PTx 200 and provides an Index within a range that spans the base codes. In a particular example, the Index can be calculated to provide a value between 0 and 15 as follows:

$$\text{Index} = (\text{RND}) \text{XOR } (TX \text{ RND } 1) \text{XOR } (TX \text{ RND } 2) \text{MOD } 16.$$

As discussed above RND is the random number generated by PRx 220. TX RND 1 is a first random number generated in PTx 200. TX RND 2 is a second random number generated in PTx 200. The function XOR refers to an exclusive OR function. MOD 16 refers to a modular 16 function. In some embodiments, each of RND and the TX random numbers can be 1-byte (8-bit) values and MOD 16 can provide a value for Index between 0 and 15, which can be represented in ½ byte (4 bits). One skilled in the art will recognize that using 8-bit random numbers in the XOR operation and a MOD 16 operation to calculate an index between 0 and 15 is an example only and that index calculations using receiver calculated and transmitter calculated random numbers that are larger can be used to provide an index value that has a broader range.

In step 406 the index value is used to choose a base code. In this particular example, where the index is a value between 0 and 15, there are 16 base codes. The base codes can be of any size, but in this particular example each of the 16 base codes can have 40 bits. The number of 40 bits is used for encoding 5 8-bit bytes as discussed below. In some embodiments, a larger number of base codes can be used and each of the base codes can be formed with more, or fewer, bits. The base codes are fixed and are shared by both PTx 200 and PRx 220. Particular base codes that can be used in embodiments of the present disclosure are such that the individual base codes are of uniform length, of a number determined by the range of the index, and are each different from one another. For illustrative purposes, the 16 base codes can be given by the following table:

| Index | Base Code (B4, B3, B2, B1, B0) |
|-------|-------------------------------|
| 0     | 0x4fa763e4cc                  |
| 1     | 0xd174d79308                  |
| 2     | 0x2cc7b36c4e                  |
| 3     | 0xc40b337039                  |
| 4     | 0x5f7fb105d6                  |
| 5     | 0x9fc4b773e1                  |
| 6     | 0xe6cde620ec                  |
| 7     | 0x716f1f85bc                  |
| 8     | 0x5b02c18c70                  |
| 9     | 0xc5cfb7ea2e                  |
| 10    | 0xf418e9d91e                  |
| 11    | 0xd85c380131                  |
| 12    | 0x375e356571                  |
| 13    | 0xd481985bcd                  |
| 14    | 0x5f8497801e                  |
| 15    | 0xbb4be990c6                  |

This index table is exemplary only and the base codes can hold other values and can be of different bit lengths. As illustrated, the example 40-bit base code (BC) as indicated above can be represented with 5 bytes, that can be labeled as (B4, B3, B2, B1, B0).

In step 408, a pre-secure code is calculated from the base code by convoluting the base code with the other data. In some embodiments, the pre-secure code can be determined as a function of the indexed base code, the random number from PRx 220 RND, and the ID from PRx 220 ID. This function may be, for example, $$\text{Pre-Secure} = G(\text{BC}(\text{index}), \text{RND}, \text{ID}, \text{SSP}).$$

In some embodiments, the 5-byte base code can be convoluted with a matching five bytes chosen from the values of RND, ID, and SSP in the function G. In a particular example, 3 bytes can be chosen from the receiver ID packet that includes the receiver ID. For example, bytes B4, B5, and B6 of the ID packet can be used. These three bytes can be combined with the single byte SSP value and the single byte random number RND and convoluted with the five bytes of the indexed base code BC (index). In some embodiments, the bytes chosen from the receiver ID can be other bytes of a packet that includes the receiver ID. The pre-secure code PSC, for example, can be calculated by compiling a code the same size as the base code from a plurality of bytes of the ID, the RND, and the SSP. An example of this can be given by PSC=(BC(index))XOR (ID *B*4,SSP,RND,ID *B*6,ID *B*5).

It should be noted that the order of the ID bytes, SSP, and RND can be changed from that indicated above and the above described calculation function G is exemplary only. A depiction of the above calculation G is provided as follows:

|  | BC B4 | BC B3 | BC B2 | BC B1 | BC B0 |
|---|---|---|---|---|---|
| XOR PSC = | ID B4 (BC B4) XOR (ID B4) | SSP (BC B3) XOR (SSP) | RND (BC B2) XOR (RND) | ID B6 (BC B1) XOR (ID B6) | ID B5 (BC B0) XOR (ID B5) | where, as discussed above, BC indicates the indexed base code, ID represents the ID from the identification packet received from PRx 220, SSP represents the signal strength value from the signal strength packet received from PRx 220, and RND indicates the random number received from PRx 220. The resulting pre-secured code (PSC) then has five bytes, which can in turn be represented as 10 half-bytes as indicated below.

In step 410, the secure code is generated from the pre-code calculated above. It should be noted, as discussed above, that the pre-secure code PSC in this example is a 5-byte (40 bit) code that can be designated as follows:

| PSC = | | | | |
|---|---|---|---|---|
| PSC B4 | PSC B3 | PSC B2 | PSC B1 | PSC B0 |
| B4-H  B4-L | B3-H  B3-L | B2-H  B2-L | B1-H  B1-L | B0-H  B0-L |

As indicated above, each byte of the pre-secure code is designated as low and high sections. The designation above follows the 8-bit designation of each byte. For example, the 8 bits of byte PSC B0 is designated as two 4-bit sections (B0-H, B0-L).

The secure code can then be assembled from the PSC and the index embedded according to a function S(PSC, Index). In particular, the secure code is assembled using a combination of the half-bytes of the PSC in combination with the value of the index. As an example, the secure code can be given by

| Secure Code = S(PSC, Index) = | | | | | | |
|---|---|---|---|---|---|---|
| B2-L | B4-H | Index | B3-H | B1-L | B2-H | B0-L |

As indicated above, one-half byte of each of the pre-secure code bytes is used and the index is embedded to construct the secure code that, in this example, has a length of three and half bytes. One skilled in the art that other arrangements from the pre-secure code and the index can be used to assemble the secure code.

In step 412, PTx 200 transmits the secure code to PRx 220. In particular, the secure code can be transmitted as part of a packet that includes a header and potential power. In some embodiments, the TX packet that includes communication 306 as illustrated in FIG. 3 can, for example, take the following form:

| TX Packet Header | Bits 7-4 | Bits 3-0 |
|---|---|---|
| B0 |  | PSC B2-L |
| B1 | PSC B4-H | Index |
| B2 | PSC B3-H | PSC B1-L |
| B3 | PSC B2-H | PSC B0-L |
| B4 | Potential Power | Potential Power |

As discussed above, the TX packet provided above includes the secure code and the potential power.

FIG. 4B illustrates process 420 that can be executed by PRx 220 to authenticate PTx 200. Process 420 begins in step 422 with receipt of the TX packet as described above that was transmitted by process 400 in step 412. In step 424, the index is retrieved from the security code in the TX packet. In step 426, PRx 220 performs the steps described above in steps 406, 408, and 410 of process 400 to calculate the secure code. In step 428, PRx 220 compares the secure code calculated in PRx 220 with that received in the TX packet. If they match, then PRx 220 authenticates PTx 200 and proceeds to communications 308 as illustrated in FIG. 3.

Figures 5A, 5B:
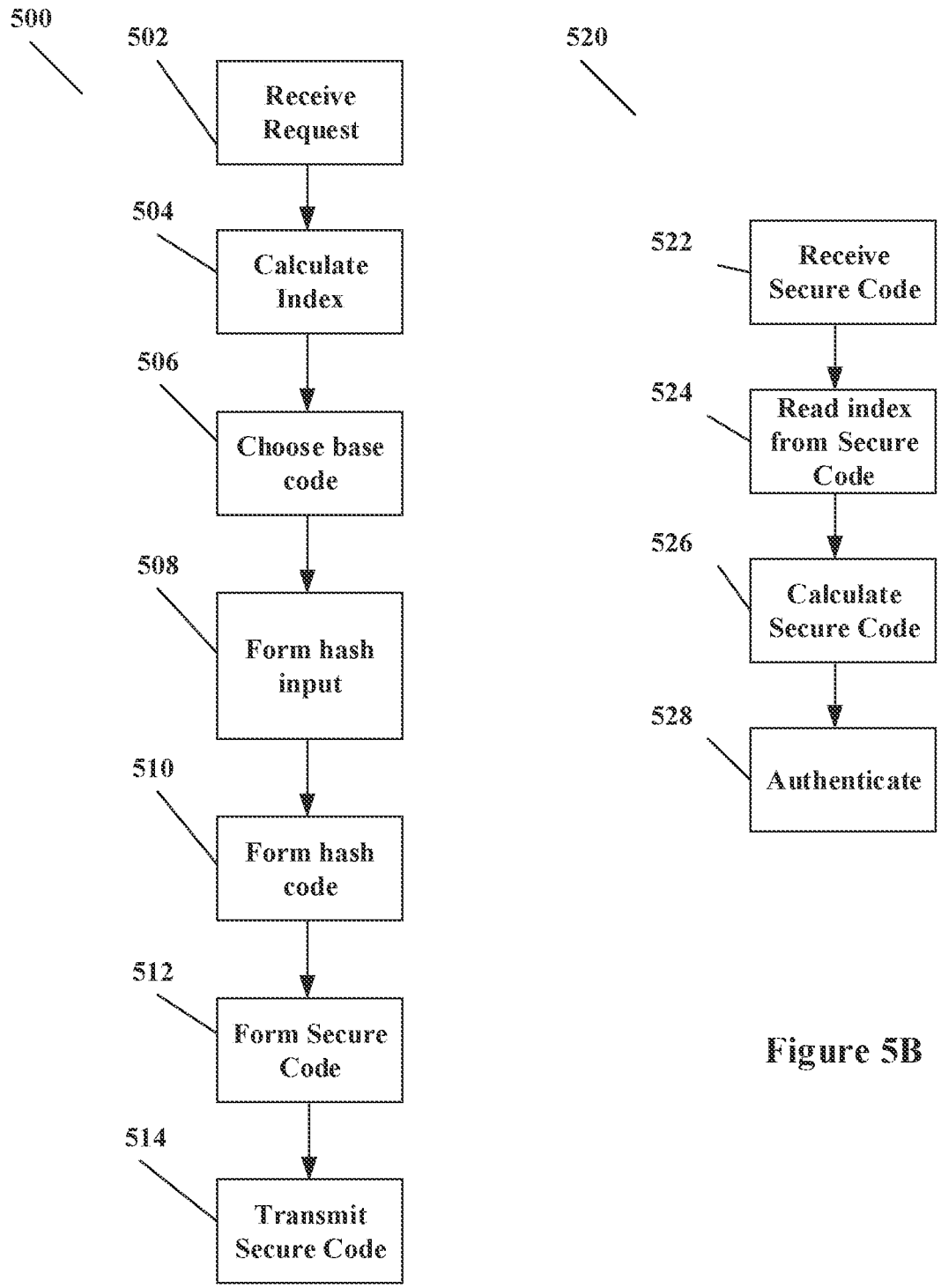
FIGS. 5A and 5B illustrates processes executed on the wireless power transmitter and the wireless power receiver, respectively, according to some embodiments.

FIGS. 5A and 5B illustrate other embodiments of authentication according to the present disclosure. FIG. 5A illustrates a process 500 that is executed on PTx 200 while FIG. 5B illustrates a process 520 that is executed on PRx 220.

As illustrated in FIG. 5A, process 500 starts when a request for authentication is received in communications 304 as illustrated in FIG. 3. In step 504 an index is calculated. As discussed above with respect to step 404 of FIG. 4A, the index can be calculated as Index=(RND)XOR (*TX* RND 1)XOR (*TX* RND 2)MOD 16.

In step 506 a base code (BC) is chosen based on the index BC(index). The base codes are discussed above with respect to step 406 of process 400 and can, for example, be 40 bit codes that can be designated with five bytes labeled (B4, B3, B2, B1, B0), as discussed above.

In step 508 a hash code input is formed based on the SSP value, the random number RND, the several bytes of the receiver ID (for example bytes B4, B5, and B6 of the receiver ID packet), and the indexed base code BC(index). Although this hash code input can be arranged in any fashion, an example of such an arrangement can be as follows:

| Hash Code Input = | | | | | | | | | |
|---|---|---|---|---|---|---|---|---|---|
| ID B4 | SSP | RND | ID B6 | ID B5 | BC B4 | BC B3 | BC B2 | BC B1 | BC B0 | where BC designates base code bytes, ID represents identification bytes, SSP represents the SSP value, and RND is the random number. As discussed above, SSP, ID, and RND are communicated to PTx 200 in communications 302 and 304 as illustrated in FIG. 3.

In step 510, a hash code is formed by performing a hashing function on the above hash code input. Any hashing function can be used. Common hashing functions include MD5, SHA-1, SHA-2, NTLM, and LANMAN. MD5 is a common hashing function that creates a hash code with 128 bits. SHA-1 is a secured hashing that creates a 160-bit hash code. SHA-2 is a suite of hashing algorithms that create a hash code of various lengths. LANMAN is a Microsoft hashing code that is not secure and rarely used. NTLM is the successor of the LANMAN code. Any hashing function can be used to create the hash code. For purposes of illustration, the 128-bit MD5 code is illustrated. Using this example, the hash code resulting from the hashing function on the above hash code input can be illustrated as follows:

| Hash Code (HC) = | | | | | | | | | | | | | | | |
|---|---|---|---|---|---|---|---|---|---|---|---|---|---|---|---|
| B15 | B14 | B13 | B12 | B11 | B10 | B9 | B8 | B7 | B6 | B5 | B4 | B3 | B2 | B1 | B0 |

In step 512, the secure code is derived from the hash code. As discussed above, each of bytes B0 through B15 can be split into 4-bit segments designated L and H segments. For example, byte B0 can be designated as B0-L and B0-H. Although any collection of bits can be selected from the hash code, in a particular example the secure code can assembled from the hash code follows:

| Secure Code = hash code (HC) bytes | | | | | |
|---|---|---|---|---|---|
| B3-L | B2-H | B2-L | Index | B 1-L | B0-H | B0-L |

As indicated in this example, multiple collections of bits are chosen from the hash code indicated above and the index is embedded at an arbitrary, but prechosen, location in the secure code.

In step 514, the secure code is transmitted to the receiver in communication 306 as indicated above. The transmit packet in communications 306 can take the form:

| TX Packet Header | Bits 7-4 | Bits 3-0 |
|---|---|---|
| B0 | | HC B3-L |
| B1 | Index | HC B2-L |
| B2 | HC B1-H | HC B1-L |
| B3 | HC B0-H | HC B0-L |
| B4 | Potential Power | Potential Power |

FIG. 5B illustrates process 520 that is executed on PRx 220 according to some embodiments. In step 522, PRx 220 receives the transmit packet with the secure code that was transmitted by PTx 200 in step 514 of process 500. In step 524, the index is retrieved from the received secure code. As indicated above, the index is embedded into a particular location in the secure code such that it can be retrieved by PRx 220.

In step 526 of process 520, PRx 220 calculates the secure code using the same algorithm described above with steps 506 through 512 of process 500. In step 528, PRx 220 compares the secure code calculated by PRx 220 with the received secure code. If the secure codes match, then PTx 200 is authenticated to PRx 220. If not, the PTx 200 is not authenticated to PRx 220.

In this disclosure, examples of authentication have been provided where PRx 220 authenticates PTx 200 by sending a random number, a SSP value, and an ID to PTx 200 and by receiving a secure code as discussed above. In some embodiments, this procedure can be reversed and PTx 200 authenticates PRx 220 by the same or similar processes as that described above.

Embodiments of the invention described herein are not intended to be limiting of the invention. One skilled in the art will recognize that numerous variations and modifications within the scope of the present invention are possible. Consequently, the present invention is set forth in the following claims.

What is claimed is:

1. A method of authentication, comprising:
receiving a signal strength packet (SSP) value, an ID, and a random number RND from a wireless power receiver;
determining an index based on the RND;
choosing a base code from a set of base codes according to the index;
determining a secure code from the base code, the index, the RND, the SSP value, and the ID; and
transmitting the secure code to the wireless power receiver,
wherein determining the index includes
determining at least one transmit random number TX RND; RND, and
convoluting the RND with the at least one TX RND to yield the index, wherein the index is in a range that spans the set of base codes.

2. The method of claim 1, wherein the at least one TX RND includes a TX RND 1 and a TX RND 2 and the index is given by Index=(RND) XOR (*TX* RND 1) XOR (*TX* RND 2) MOD 16.

3. The method of claim 1, wherein the set of base codes includes sixteen 5-byte codes.

4. A method of authentication, comprising:
receiving a signal strength packet (SSP) value, an ID, and a random number RND from a wireless power receiver;
determining an index based on the RND;
choosing a base code from a set of base codes according to the index;

determining a secure code from the base code, the index, the RND, the SSP value, and the ID; and
transmitting the secure code to the wireless power receiver,
wherein determining the secure code includes
convoluting the base code with the ID, SSP, and the RND to form a pre-secure code, and
assembling the secure code from the pre-secure code and the index.

5. The method of claim 4, wherein the convoluting to form the pre-secure code includes:
selecting a plurality of bytes from the ID;
assembling a code of length equal to that of the base code from the plurality of bytes from the ID, the SSP, and the RND; and
convoluting the base code with the code.

6. The method of claim 5, wherein the ID includes bytes ID B4, ID B5, and ID B6, and wherein the code is given by (ID B4, SSP, RND, ID B6, ID B5) and convoluting the base code with the code yields the pre-secure code as (base code) XOR (ID $B$4, SSP, RND, ID $B$6, ID $B$5).

7. The method of claim 4, wherein assembling the secure code from the pre-secure code includes
selecting a plurality of half-bytes from the pre-secure code; and
arranging the plurality of half-bytes and the index into the secure code.

8. The method of claim 7, wherein selecting a plurality of half-bytes form the pre-secure code includes selecting at least one half-byte from each byte of the pre-secure code.

9. A method of authentication, comprising:
receiving a signal strength packet (SSP) value, an ID, and a random number RND from a wireless power receiver;
determining an index based on the RND;
choosing a base code from a set of base codes according to the index;
determining a secure code from the base code, the index, the RND, the SSP value, and the ID; and
transmitting the secure code to the wireless power receiver,
wherein determining the secure code includes
determining a hash input from the ID, the SSP value, the random number, and the base code;
performing a hashing function on the hash input to determine a hash code; and
assembling the secure code from the hash code and the index.

10. The method of claim 9, wherein assembling the secure code includes
selecting a plurality of half-bytes from the hash code; and
arranging the plurality of half-bytes with the index into the secure code.

11. A method of authentication, comprising:
transmitting a single strength packet (SSP) value, an ID, and a random number to a wireless power transmitter;
receiving a secure code from the wireless power transmitter;
retrieving an index from the secure code;
determining a base code from a set of base codes according to the index;
calculating a second secure code from the SSP, the ID, the random number, and the base code; and
authenticating the wireless power transmitter by comparing the secure code and the second secure code,
wherein calculating the second secure code includes
convoluting the base code with the ID, SSP, and random number to form a pre-secure code; and
assembling the second secure code from the pre-secure code and the index.

12. The method of claim 11, wherein the convoluting to form the pre-secure code includes:
selecting a plurality of bytes from the ID;
assembling a code of length equal to that of the base code from the plurality of bytes from the ID, the SSP, and the RND; and
convoluting the base code with the code.

13. A method of authentication, comprising:
transmitting a single strength packet (SSP) value, an ID, and a random number to a wireless power transmitter;
receiving a secure code from the wireless power transmitter;
retrieving an index from the secure code;
determining a base code from a set of base codes according to the index;
calculating a second secure code from the SSP, the ID, the random number, and the base code; and
authenticating the wireless power transmitter by comparing the secure code and the second secure code,
wherein calculating the second secure code includes
determining a hash input from the ID, the SSP value, the random number, and the base code;
performing a hashing function on the hash input to determine a hash code; and
assembling the secure code from the hash code and the index.

14. A wireless power transmitter, comprising:
an inverter coupled to drive a transmission coil;
a FSK modulator coupled to the inverter to transmit data to a wireless power receiver;
an ASK demodulator coupled to the inverter to receive data from the wireless power receiver; and
a processor coupled to the inverter, the FSK modulator, and the ASK demodulator, the processor executing instructions to
receive a SSP value, an ID, and a random number RND from a wireless power receiver;
determine an index based on the RND;
choose a base code from a set of base codes according to the index;
determine a secure code from the base code, the index, the RND, the signal strength packet (SSP) value, and the ID; and
transmit the secure code to the wireless power receiver,
wherein the instructions to determine the index includes instructions to
determine at least one transmit random number TX RND;
convolute the RND with the at least one TX RND to yield the index, wherein the index is in a range that that spans the set of base codes.

15. A wireless power transmitter, comprising:
an inverter coupled to drive a transmission coil;
a FSK modulator coupled to the inverter to transmit data to a wireless power receiver;
an ASK demodulator coupled to the inverter to receive data from the wireless power receiver; and
a processor coupled to the inverter, the FSK modulator, and the ASK demodulator, the processor executing instructions to receive a SSP value, an ID, and a random number RND from a wireless power receiver;

determine an index based on the RND;

choose a base code from a set of base codes according to the index;

determine a secure code from the base code, the index, the RND, the signal strength packet (SSP) value, and the ID; and transmit the secure code to the wireless power receiver, wherein instructions to determine the secure code includes instructions to convolute the base code with the ID, SSP, and the RND to form a pre-secure code; and assemble the secure code from the pre-secure code and the index.

16. The wireless power transmitter of claim 15, wherein instructions to assemble the secure code from the pre-secure code includes instructions to select a plurality of half-bytes from the pre-secure code; and arrange the plurality of half-bytes and the index into the secure code.

17. The wireless power transmitter of claim 15, wherein instructions to determine the secure code includes instructions to determine a hash input from the ID, the SSP value, the random number, and the base code;

perform a hashing function on the hash input to determine a hash code; and assemble the secure code from the hash code and the index.

18. A wireless power receiver, comprising:

a rectifier coupled to a receiver coil;

a FSK demodulator coupled to the rectifier to receive data from a wireless transmitter;

an ASK modulator coupled to the rectifier to transmit data to the wireless transmitter; and a processor coupled to the rectifier, the FSK demodulator, and the ASK modulator, the processor executes instructions to transmit a signal strength packet (SSP) value, an ID, and a random number to a wireless power transmitter;

receive a secure code from the wireless power transmitter;

retrieve an index from the secure code;

determine a base code from a set of base codes according to the index;

calculate a second secure code from the SSP, the ID, the random number, and the base code; and authenticate the wireless power transmitter by comparing the secure code and the second secure code, wherein instructions to calculate the second secure code includes instructions to convolute the base code with the ID, SSP, and random number to form a pre-secure code; and assemble the second secure code from the pre-secure code and the index.

19. A wireless power receiver, comprising:

a rectifier coupled to a receiver coil;

a FSK demodulator coupled to the rectifier to receive data from a wireless transmitter;

an ASK modulator coupled to the rectifier to transmit data to the wireless transmitter; and a processor coupled to the rectifier, the FSK demodulator, and the ASK modulator, the processor executes instructions to transmit a signal strength packet (SSP) value, an ID, and a random number to a wireless power transmitter;

receive a secure code from the wireless power transmitter;

retrieve an index from the secure code;

determine a base code from a set of base codes according to the index;

calculate a second secure code from the SSP, the ID, the random number, and the base code; and authenticate the wireless power transmitter by comparing the secure code and the second secure code, wherein instructions to calculate the second secure code includes instructions to determine a hash input from the ID, the SSP value, the random number, and the base code;

perform a hashing function on the hash input to determine a hash code; and assemble the secure code from the hash code and the index.

* * * * *